United States Patent Office 3,027,603
Patented Apr. 3, 1962

3,027,603
TEXTILE FIBER DRAFTING ELEMENT
William L. Mason, Pequea Township, Lancaster County, Pa., assignor to Armstrong Cork Company, Lancaster, Pa., a corporation of Pennsylvania
No Drawing. Filed Aug. 22, 1955, Ser. No. 529,944
1 Claim. (Cl. 260—43)

This invention relates to the drafting of textile fibers and is concerned particularly with the drafting of fibers employing cots or aprons having a drafting surface composed of vulcanized compounded butadiene-acrylonitrile rubber.

Drafting elements of the butadiene-acrylonitrile type, compounded with certain surface active materials, particularly the nonionic and cationic classes of such materials, and including animal glue, are disclosed in the copending application of Richard A. Garrett, Serial No. 427,343, filed May 3, 1954, now Patent 2,811,752, dated Nov. 5, 1957. The present invention is related to this type of drafting element which includes (a) butadiene-acrylonitrile rubber, (b) a surface active agent, preferably of the nonionic type, and, optionally, (c) animal glue.

It is known that the drafting qualities of butadiene-acrylonitrile cots and aprons are improved by the incorporation of certain surface active materials (Garrett Patent 2,811,752). The addition of the surface active material serves to modify the properties of the rubber polymer, and it is now recognized that it is such modification which alters the textile fiber drafting qualities of the vulcanized compound, enhancing lap resistance and substantially improving the end pick-up resistance of cots and aprons made from such compounds.

However, in the fabrication of such products from compounds containing surface active materials, it has been found desirable in many instances and essential in others to incorporate relatively large volumes of finely divided filler material into compounds to attain the desired physical properties in the stocks, i.e., stiffness, reduced nerve, etc., to permit effective and economical commercial production of fiber drafting elements therefrom. I have discovered that the effect of particulate fillers in the compound is to materially impair the drafting qualities of the finished product, a particulate filler loaded cot, for instance, losing its lap resistance almost proportionately to the surface area of the filler employed. Thus, the improved qualities derived from compounding the rubber polymer with a surface active material may be seriously impaired where the use of such material requires a heavy filler loading to attain economical factory fabrication.

The present invention is based on the discovery that certain resinous materials which are compatible with unvulcanized and vulcanized butadiene-acrylonitrile copolymer rubber will, when compounded with butadiene-acrylonitrile rubber and a surface active material, serve the dual functions of reducing or eliminating the fabricating problems mentioned above and of enhancing the drafting qualities of the vulcanized product over similar compounds loaded with conventional particulate fillers. As an illustration, a butadiene-acrylonitrile cot compound including a nonionic surface active agent and having incorporated therein a heat-reactive phenolformaldehyde resin which is soluble in the unvulcanized rubber copolymer will have its working properties so altered that only a minor amount, if any, of particulate filler material will be required. The drafting properties of the resulting product will be much better than those of a similarly compounded cot containing a large amount of mineral filler material, for instance, without the heat-reactive resin.

Another important improvement which flows from the present invention is the large reduction in the quantity of curing agent normally required for optimum vulcanization of the butadiene-acrylonitrile compound. Heretofore, with glue-loaded compounds particularly, large volumes of sulfur or other vulcanizing compounds have been required to obtain a product having the desired Shore hardness value and other physical properties. As disclosed in Baymiller Patent No. 2,450,409, for instance, Example 1, 10 parts of sulfur were required to attain the desired properties in the finished product. With the compounds of the present invention, as little as 1 part of sulfur per 100 parts of butadiene-acrylonitrile copolymer gives satisfactory results and from 2 to 3 parts per 100 parts of rubber are preferred. It is possible to attain the desired Shore hardness in the finished stock with this smaller amount of sulfur in the compounds of the present invention, a result which could not be achieved with the Baymiller patent referred to above.

In order that the invention will be readily understood, a few examples will be given to illustrate the method of compound preparation and also drafting element fabrication.

Example I

| | Parts by weight |
|---|---|
| Butadiene-acrylonitrile rubber (Chemigum N-4) | 100 |
| Surface active material (Nonisol 100) | 15 |
| Sulfur | 3 |
| Zinc oxide | 5 |
| Pigment | 6 |
| Rubber-soluble resin (Durez Resin No. 12687) | 20 |

In the above example, Chemigum N-4 is a butadiene-acrylonitrile rubber containing about 70 parts of butadiene and about 30 parts of acrylonitrile in the copolymer. In place of this particular rubber, other butadiene-acrylonitrile elastomers may be substituted. There is nothing critical about the ratio of butadiene to acrylonitrile. For best results, materials containing from 60 to 80 parts of butadiene and 40 to 20 parts of acrylonitrile are preferred.

The Nonisol 100 is a nonionic surface active material, the essential active ingredientt of which is polyethylene glycol (400) monolaurate.

The particular surface active material employed is not critical, and any of those disclosed in the Garrett application may be used. Preferably the surface active material employed is selected from the group consisting of nonionic and cationic surface active materials containing long chain hydrophobic molecular groups and mixtures thereof which impart lap resistance to the textile fiber drafting element. Generally, about 10 to 30 parts of surface active material per 100 parts by weight of rubber will be found to give good results. The proportioning may be varied, as more fully discussed in Garrett Patent 2,811,752 where a range of from about 2 to 70 parts for each 100 parts of butadiene-acrylonitrile rubber is given.

Sulfur is a conventional vuclanization agent. Other vulcanizing agents may be used, as is well-known in the technology of butadiene-acrylonitrile rubber compounding.

Zinc oxide is used as an activator. It is a common rubber compounding ingredient and the usual substitutions may be made for it, depending upon the particular rubber selected, the vulcanizing agent employed, the presence of vulcanization accelerators, and other variable factors.

The pigment may be titanium dioxide and is used to impart the desired color to the cot or apron compound. It may be omitted or other coloring agents may be used.

The Durez resin is a thermosetting, cashew nut oil-modified phenolformaldehyde resin. In place of it, other thermosetting resins which are capable of being activated at temperatures within the range employed in vulcanization of the compound may be substituted, provided of course they are soluble or compatible with the unvulcanized butadiene-acrylonitrile rubber. Durez 7031–A, which is a thermosetting phenol-formaldehyde resin, is another example of a suitable resin.

Certain natural resinous materials which are soluble in or compatible with unvulcanized butadiene-acrylonitrile rubber may be used, such as a coumarone-indene resin sold under the trade-mark "Piccoumaron 480–K." This resin is thermoplastic. Other thermoplastic resins having similar properties may be used, although as a general class, the heat-reactive resins are preferred. The modified styrene resins which are known rubber compounding resins may be used. Included in this class are those sold under the trade names "Marbon 8000," "Cycolac 12830," and "Plio-tuf G85–C."

All of the foregoing resins are either soluble in or compatible with the vulcanized butadiene-acrylonitrile rubber at textile mill operating temperatures in proportions of 10 to 30 parts of resin to 100 parts of rubber by weight and produce an essentially homogeneous rubber-resin mixture, with the resin for all practical purposes being dissolved in the rubber. The term "rubber-soluble resin" is used to comprehend this class of resins. The resins all serve to increase the modulus of elasticity of the vulcanized mixture. The resin must be capable of assimilation by the rubber and must not separate therefrom during or after vulcanization, for undesirable effects may result, such as a lowering of tensile strength, poorer wear resistance, etc. The quantity of resin employed will depend upon many factors, such as the particular resin or mixture of resins selected for use, the physical properties desired in the final product, the incorporation of animal glue into the compound, the butadiene-acrylonitrile rubber used, etc.

In the preparation of the compound, the practice disclosed in my copending application Serial No. 479,849, filed January 4, 1955, and now abandoned, and entitled, "Method of Processing Synthetic Rubber," may be used. The present is a continuation-in-part of that application.

The process of preparing the material is generally as follows: The Chemigum and the resin, together with the zinc oxide, pigment, and the surface active material, are blended on a cold rubber mill. After blending, the mill is heated to about 320° F. and the batch further milled at that temperature for about 10 minutes. The mill is then cooled to about room temperature (80° F.) and the sulfur is added and thoroughly blended in.

The stock may be extruded into hollow cylindrical form, placed on mandrels, wrapped with wet fabric tape, vulcanized at a temperature of about 300° F. for 50 minutes in open steam, and removed from the curing chamber. Thereafter the fabric tape is removed; the product is removed from the mandrel; the outer surface of the product is ground to the desired surface finish and then is severed into lengths for use as textile fiber drafting cots. Of course, the finishing operations may be performed with the stock on the mandrel or after it has been removed therefrom. Preferably, finishing is effected after removal of the body from the mandrel upon which it is vulcanized. The vulcanized rubber-resin compound has great affinity for metal, particularly when heated under applied pressure on the mandrel. Therefore, it is essential to properly coat or otherwise treat the mandrel with a lubricant or release agent to facilitate removal of the vulcanized tube.

The cot thus formed has a Shore hardness of about 60 and possesses good lap and end pick-up resistance, making it a fine drafting element, particularly suitable for operation with artificial fibers which are particularly difficult to draft.

*Example II*

| | Parts by weight |
|---|---|
| Chemigum N–4 | 100 |
| Glue | 10 |
| Nonisol 100 | 20 |
| Sulfur | 2 |
| Zinc oxide | 5 |
| Pigment | 6 |
| Durez Resin No. 12687 | 10 |
| Silene EF (Filler) | 10 |
| Plasticizer | 10 |

The same practice as disclosed above may be employed in the preparation of a cot stock in accordance with this example. In this example, glue is employed, whereas in Example I, there is no glue present. The glue preferably contains about 20%–35% of water for easy processing. For best results, the quantity of glue should not exceed substantially 50 parts by weight for each 100 parts by weight of rubber. There is also included in this compound a small amount of mineral filler and a rubber plasticizer. The ingredients are charged to a cold mill and blended thereon, except for the sulfur or other vulcanizing agent. After blending, the mass is heated to about 320° F. and milled at that temperature for about 10 minutes. The mass is then cooled and milled to about 80° F.; the sulfur is added and thoroughly blended in. The extruded stock is formed, disposed on a mandrel, wrapped, cured at 300° F. for 15 minutes, removed from the mandrel, and fabricated into textile fiber drafting cots in the same manner as in Example I. The cot formed in this manner will have a Shore hardness of about 50 and will possess very good lap and end pick-up resistance, comparable to Example I.

In the above example, the plasticizer may be "dipolymer oil" or other compatible plasticizer such as tricresyl phosphate or other plasticizers well-known in the rubber art.

The following example illustrates another compound which may be prepared without the use of any particulate filler.

*Example III*

| | Parts by weight |
|---|---|
| Chemigum N–4 | 100 |
| Glue | 10 |
| Nonisol 100 | 15 |
| Sulfur | 3 |
| Zinc oxide | 5 |
| Pigment | 6 |
| Durez Resin No. 12687 | 20 |

This material may be compounded as in Examples I and II and may be formed into a textile fiber drafting cot. The material will be somewhat harder, having a Shore hardness of 68. The drafting qualities of the product will make it suitable for use on artificial fibers.

For some services, where a hard stock is required, it may be desirable to increase the filler content. With compounds of the present invention, this may be accomplished with some sacrifice in drafting qualities, but the unfilled compositions possess such a high degree of lap resistance and end pick-up resistance that the incorporation of up to 50 parts by weight of particulate filler may be tolerated, based on 100 parts by weight of rubber.

The following is an example of a cot compound, loaded with a filler which is much coarser than the Silene EF filler of Example II.

*Example IV*

| | Parts by weight |
|---|---|
| Butadiene-acrylonitrile rubber (Chemigum N–4) | 100 |
| Animal glue | 50 |
| Sulfur | 3 |
| Zinc oxide | 5 |
| Pigment | 15 |
| Surface active material (Nonisol 100) | 15 |
| Rubber-soluble resin (Durez Resin No. 12687) | 20 |
| Calcium carbonate filler | 50 |

This compound may be prepared in the same manner as Example II and may be fabricated into a cot as previously described. The finished product will have a Shore hardness in the order of 85.

Any of the foregoing stocks may also be used in the fabrication of drafting aprons. The practice outlined in Billmeyer Patent No. 2,482,702 may be followed in apron fabrication. If desired, after the apron has been fabricated, the rubber cured, and the surface buffed to the desired smoothness, the apron may be chlorine treated or otherwise treated with a free halogen as disclosed in Baymiller Patent No. 2,450,408. The present invention, however, so improves the drafting properties of the apron that for most services chlorine or other halogen treatment is not necessary.

While it is preferred to incorporate glue in the compound, it will be noted in Example I that glue is not an essential component. As noted in Example II, however, the invention is useful in compounds where a combination of glue and surface active material is used.

I claim:

A textile fiber drafting element having an improved drafting surface comprising a vulcanized matrix which consists essentially of, in relative proportions, 100 parts by weight of butadiene-acrylonitrile rubber having blended therein at least 10 parts by weight of a compatible surface active material which enhances the lap resistance of the rubber, said material being selected from the group consisting of nonionic and cationic surface active materials containing long chain hydrophobic molecular groups and mixtures thereof, from 10 to 30 parts by weight of a rubber-soluble phenol-formaldehyde resin which increases the modulus of elasticity of the vulcanized rubber, from 1 to 3 parts by weight of sulphur and from 0 to 50 parts by weight of particulate filler.

References Cited in the file of this patent

UNITED STATES PATENTS

| | | |
|---|---|---|
| 1,819,289 | Hayes | Aug. 18, 1931 |
| 2,341,656 | Rockoff | Feb. 15, 1944 |
| 2,450,409 | Baymiller | Oct. 5, 1948 |
| 2,459,739 | Groten | Jan. 18, 1949 |
| 2,570,935 | Freedlander | Oct. 9, 1951 |
| 2,729,860 | Balkin et al. | Jan. 10, 1956 |
| 2,773,288 | Rockoff | Dec. 11, 1956 |
| 2,811,752 | Garrett | Nov. 5, 1957 |
| 2,844,502 | Paxton | July 22, 1958 |
| 2,858,283 | Garrett | Oct. 28, 1958 |